United States Patent
Chapman et al.

(10) Patent No.: US 10,818,097 B2
(45) Date of Patent: Oct. 27, 2020

(54) SPATIAL POSITION CALCULATION SYSTEM FOR OBJECTS IN VIRTUAL REALITY OR AUGMENTED REALITY ENVIRONMENT

(71) Applicant: Disney Enterprises, Inc., Burbank, CA (US)

(72) Inventors: Steven Chapman, Thousand Oaks, CA (US); Joseph Hager, Valencia, CA (US); Joseph Popp, Cerritos, CA (US); Calis Agyemang, Los Angeles, CA (US); Mehul Patel, Stevenson Ranch, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 443 days.

(21) Appl. No.: 15/839,729

(22) Filed: Dec. 12, 2017

(65) Prior Publication Data

US 2019/0180516 A1 Jun. 13, 2019

(51) Int. Cl.
*G06T 19/20* (2011.01)
*G06T 19/00* (2011.01)
*G01S 17/89* (2020.01)
*G01S 7/481* (2006.01)
*G01S 17/04* (2020.01)

(52) U.S. Cl.
CPC ............ *G06T 19/20* (2013.01); *G01S 7/4814* (2013.01); *G01S 7/4817* (2013.01); *G01S 17/04* (2020.01); *G01S 17/89* (2013.01); *G06T 19/006* (2013.01)

(58) Field of Classification Search
None
See application file for complete search history.

(56) References Cited

U.S. PATENT DOCUMENTS

| | | |
|---|---|---|
| 5,235,363 A | 8/1993 | Vogeley et al. |
| 5,450,148 A | 9/1995 | Shu et al. |
| 5,673,082 A | 9/1997 | Wells et al. |
| 5,684,531 A | 11/1997 | Li et al. |

(Continued)

FOREIGN PATENT DOCUMENTS

WO 2014111633 7/2014

OTHER PUBLICATIONS

Shirai, Yoshiaki, "Advanced Robot Technology Project," Journal of Information Processing, vol. 9, No. 2, Apr. 17, 1986.

(Continued)

*Primary Examiner* — Isam A Alsomiri
*Assistant Examiner* — Amir J Askarian
(74) *Attorney, Agent, or Firm* — Dorsey & Whitney LLP

(57) ABSTRACT

A user control apparatus has a laser emitter that emits a laser beam in a real-world environment. Further, the user control apparatus has an optical element that receives the laser beam and generates a plurality of laser beams such that a starting point and a plurality of endpoints, each corresponding to one of the plurality of laser beams, form a laser frustum. In addition, the user control apparatus has an image capture device that captures an image of a shape of the laser frustum based on a reflection of the plurality of laser beams from an object in the real-world environment so that a spatial position of the object in the real-world environment is determined for an augmented reality or virtual reality user experience.

20 Claims, 9 Drawing Sheets

(56) References Cited

U.S. PATENT DOCUMENTS

| | | |
|---|---|---|
| 6,292,171 B1 | 9/2001 | Fu et al. |
| 7,268,802 B2 | 9/2007 | Stavely et al. |
| 7,492,448 B2 | 2/2009 | Blair |
| 8,153,972 B2 | 4/2012 | DeMarco et al. |
| 8,665,427 B2 | 3/2014 | Young et al. |
| 9,132,342 B2 | 9/2015 | Balachandreswaran et al. |
| 9,163,933 B1 | 10/2015 | Olen |
| 9,197,810 B2 | 11/2015 | Troy et al. |
| 9,459,692 B1 | 10/2016 | Li |
| 9,557,630 B1 * | 1/2017 | Marason .............. G03B 21/142 |
| 9,599,821 B2 | 3/2017 | Van Curen et al. |
| 10,048,378 B2 * | 8/2018 | Gogolla .............. G01C 15/002 |
| 10,257,507 B1 * | 4/2019 | Trail .................... G06K 9/2036 |
| 10,326,500 B1 * | 6/2019 | Qu .......................... H04B 7/26 |
| 2013/0027548 A1 * | 1/2013 | Gere ....................... H04N 5/33 |
| | | 348/140 |
| 2014/0063489 A1 * | 3/2014 | Steffey .................... G01S 17/89 |
| | | 356/72 |
| 2016/0267712 A1 | 9/2016 | Nartker et al. |
| 2017/0280132 A1 * | 9/2017 | Tohme ................. G01S 7/4808 |
| 2017/0374341 A1 * | 12/2017 | Michail .................. G06T 15/06 |
| 2018/0095175 A1 * | 4/2018 | O'Keeffe ................ G01S 17/42 |

OTHER PUBLICATIONS

Klein, Georg, "Visual Tracking for Augmented Reality," Thesis submitted for the degree of Doctor of Philosophy, University of Cambridge, Department of Engineering, Jan. 2006.
"Lighthouse—Virtual Reality and Augmented Reality Wiki—VR & AR Wiki," https://xinreality.com/wikiLighthouse, May 20, 2017.

* cited by examiner

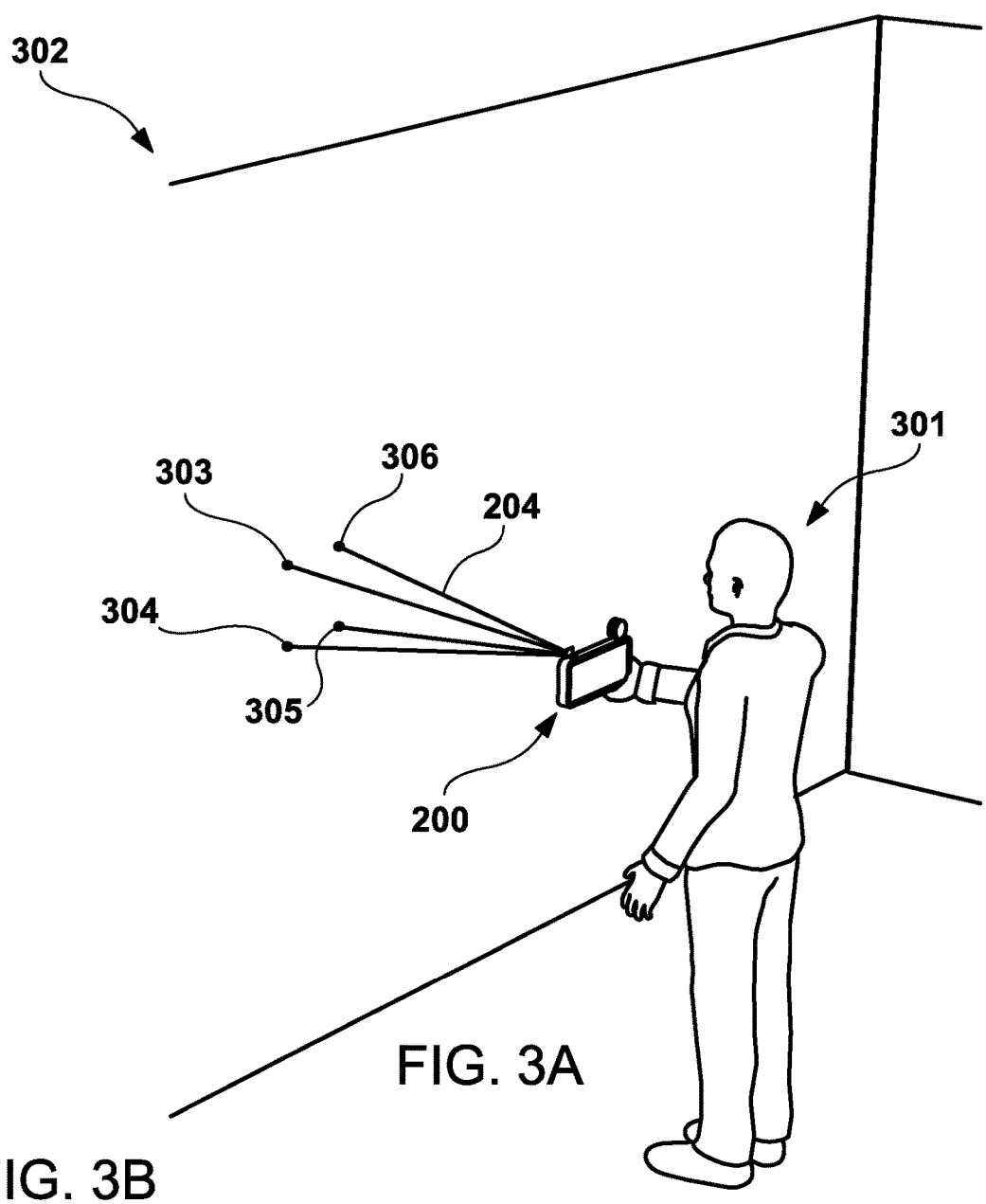
FIG. 3A
FIG. 3B
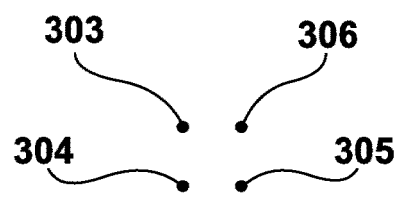

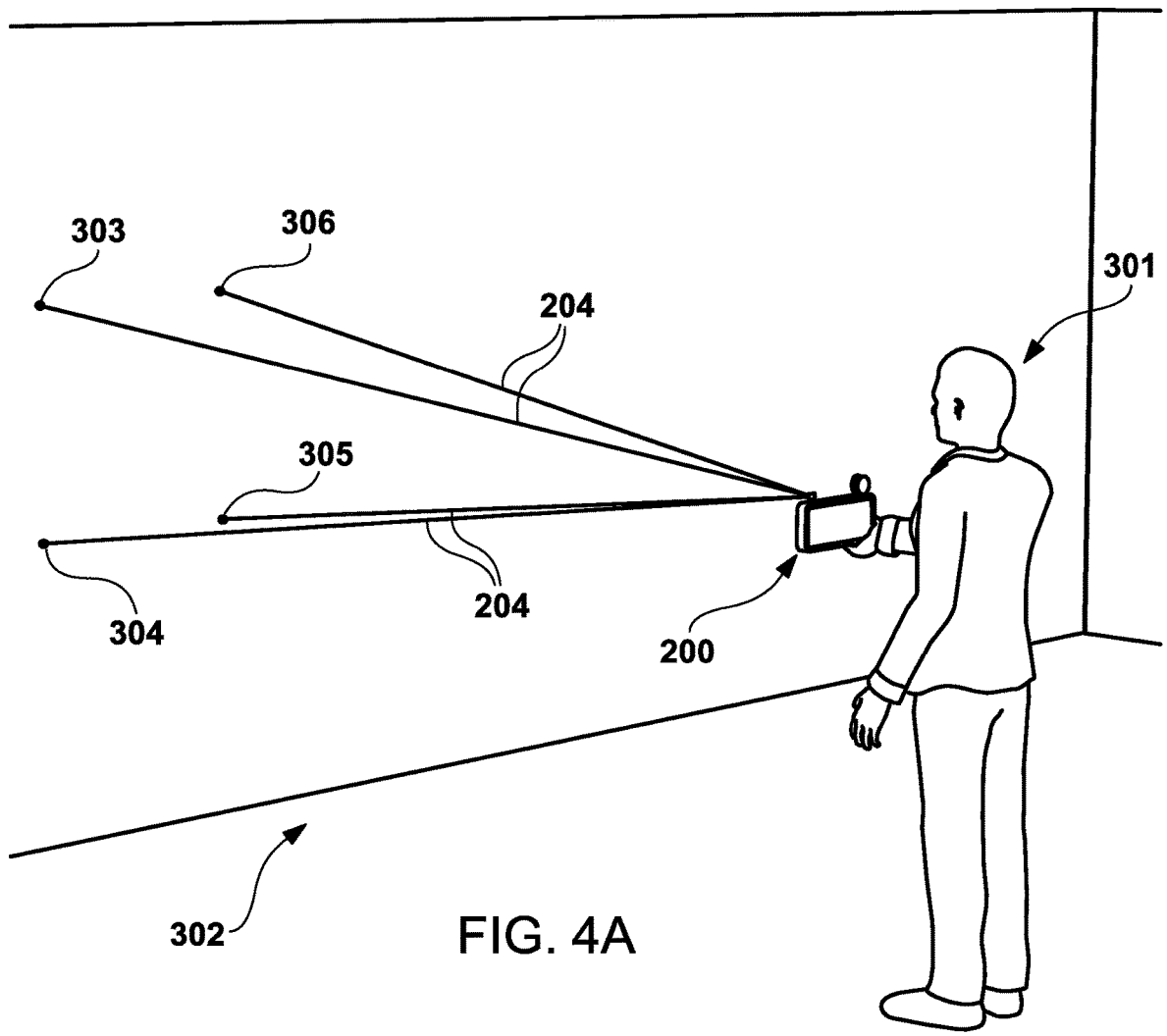
FIG. 4A
FIG. 4B
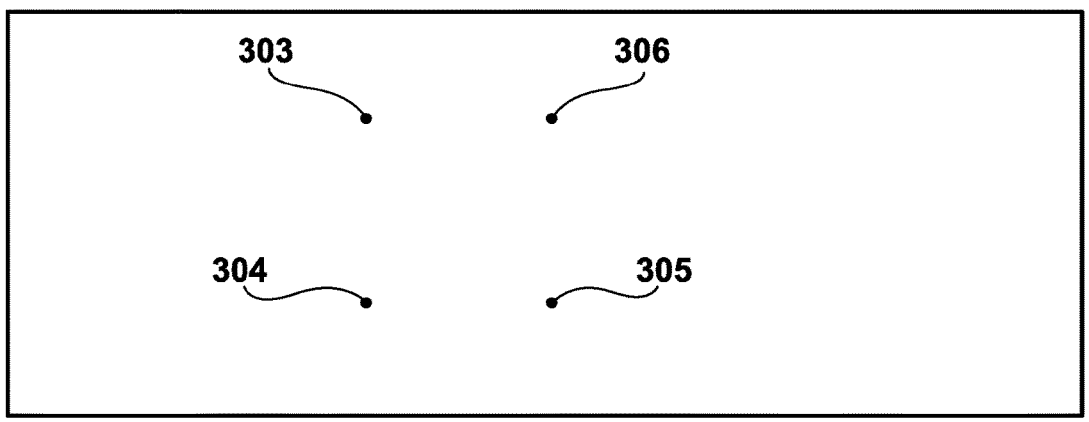

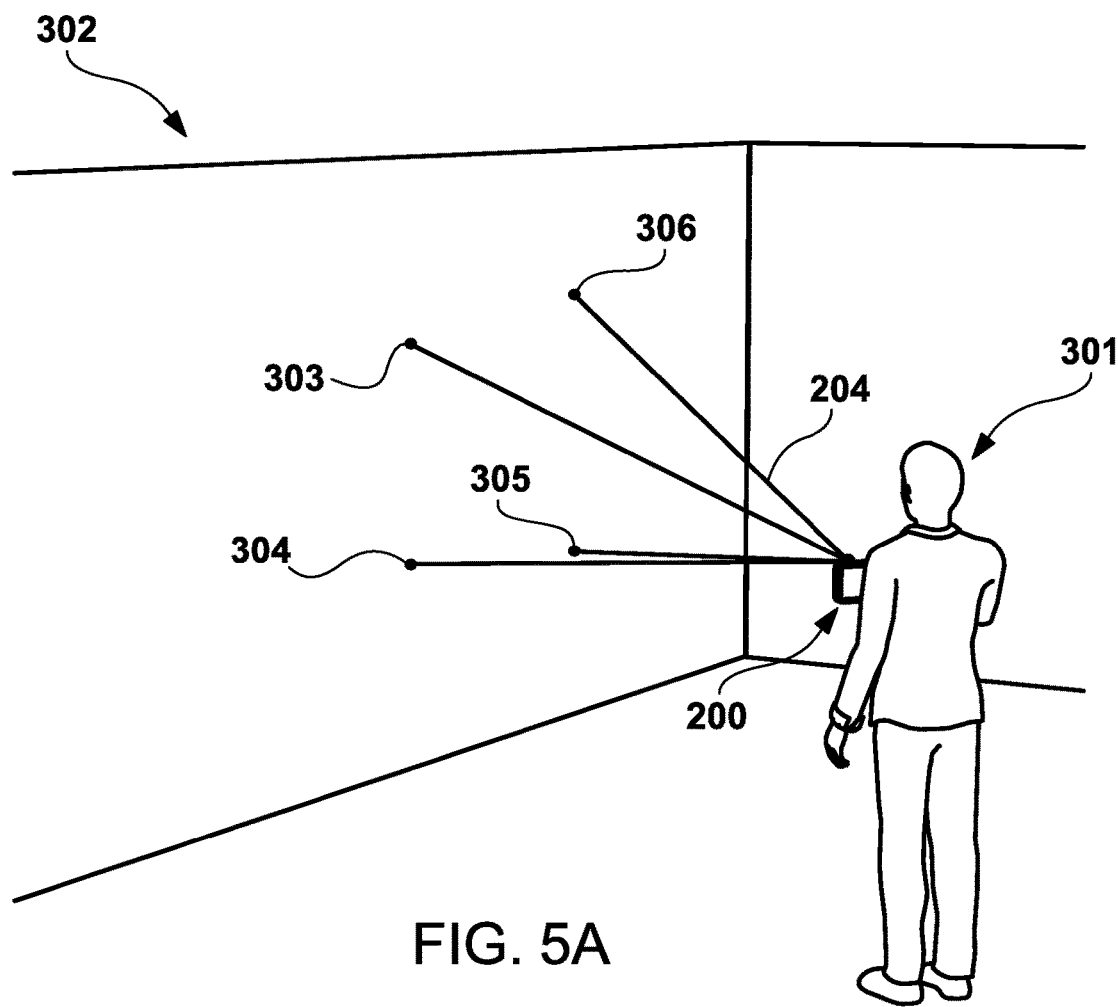
FIG. 5A
FIG. 5B
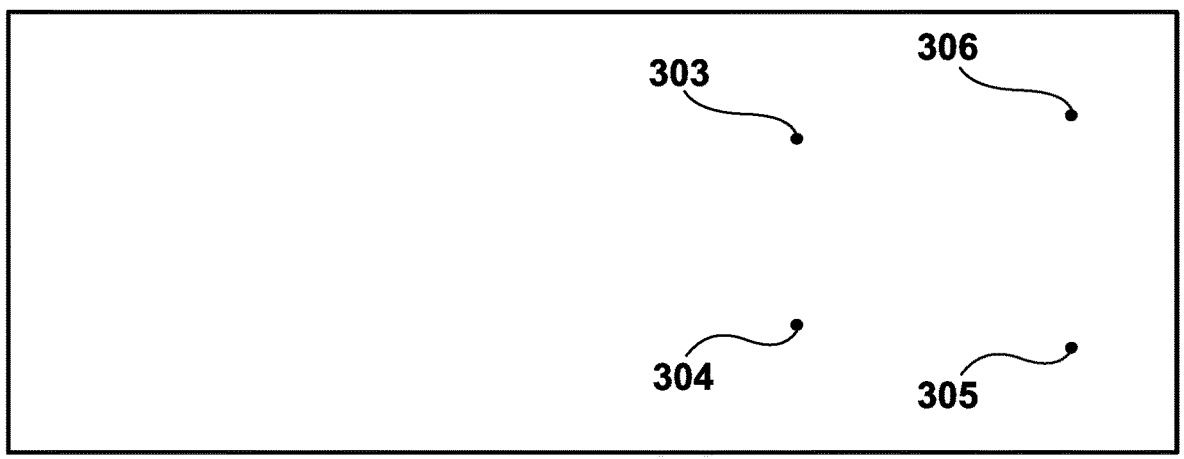

SPATIAL POSITION CALCULATION SYSTEM FOR OBJECTS IN VIRTUAL REALITY OR AUGMENTED REALITY ENVIRONMENT

BACKGROUND

1. Field

This disclosure generally relates to the field of user experiences. More particularly, the disclosure relates to a virtual reality ("VR") and/or an augmented reality ("AR") environment.

2. General Background

VR and AR configurations typically involve a determination of user control and consumption devices (e.g., a remote control) with respect to three-dimensional ("3-D") locations of objects in the real world. Such configurations thereby allow for an augmented user experience. Yet, multiple sensors and transmitters are often used in current configurations to perform such analyses. The multitude of sensors and transmitters often leads to a cumbersome and expensive user experience. As a result, current configurations do not provide an optimal VR and/or AR user experience.

SUMMARY

In one aspect, a user control apparatus has a laser emitter that emits a laser beam in a real-world environment. Further, the user control apparatus has an optical element that receives the laser beam and generates a plurality of laser beams such that a starting point and a plurality of endpoints, each corresponding to one of the plurality of laser beams, form a laser frustum. In addition, the user control apparatus has an image capture device that captures an image of a shape of the laser frustum based on a reflection of the plurality of laser beams from an object in the real-world environment so that a spatial position of the object in the real-world environment is determined for an augmented reality or virtual reality user experience.

In another aspect, a system has a storage device that stores one or more dimensions of a real-world environment. Further, the system has a receiver that receives an image of a shape of a laser frustum based on a plurality of laser beams being emitted toward, and reflected from, an object in the real-world environment. In addition, the system has a processor that determines a spatial position of the object in the real-world environment based on the one or more dimensions of the real-world environment and the shape of the laser frustum. The spatial position of the object is determined for an augmented reality or virtual reality user experience.

In another aspect, a computer program product comprises a non-transitory computer readable storage device having a computer readable program stored thereon. The computer readable program when executed on a computer causes the computer to perform the functionality of the system described herein. In yet another aspect, a process performs the functionality of the system described herein.

BRIEF DESCRIPTION OF THE DRAWINGS

The above-mentioned features of the present disclosure will become more apparent with reference to the following description taken in conjunction with the accompanying drawings, wherein like reference numerals denote like elements and in which:

FIG. 3A illustrates the user positioned in a first portion of the real-world environment whereby the user is directly in front of, and in close proximity to, a wall in the real-world environment.

FIG. 3B illustrates an example of the image of the endpoints reflected when the user is in close proximity to the wall in FIG. 3A.

FIG. 4A illustrates the user positioned in a second portion of the real-world environment whereby the user is directly in front of a wall in the real-world environment.

FIG. 4B illustrates an example of the image of the endpoints reflected when the user is at a farther distance to the wall illustrated in FIG. 4A.

FIG. 5A illustrates the user positioned in a third portion of the real-world environment whereby the user is off to an angle with respect to the wall.

FIG. 5B illustrates an example of the image of the endpoints reflected when the user is off to an angle with respect to the wall illustrated in FIG. 5A.

DETAILED DESCRIPTION

A configuration for calculating the real-world spatial position of an object in a VR and/or AR environment is provided. The configuration includes a user control device that emits one or more lasers for determining the position of the user control device within a real-world environment.

Figure 1:
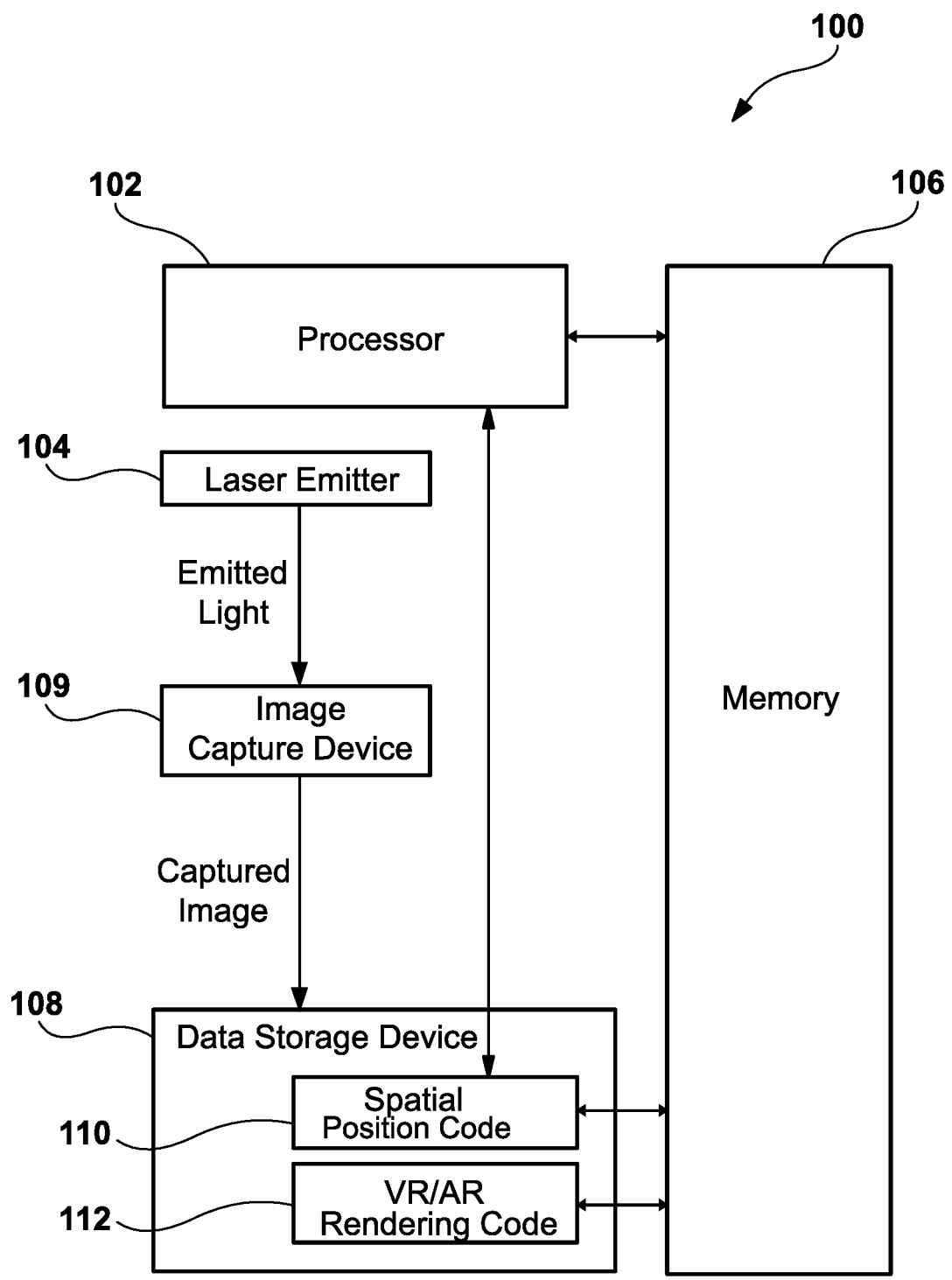
FIG. 1 illustrates a spatial position calculation system that calculates the spatial position of an object in a real-world environment.

FIG. 1 illustrates a spatial position calculation system 100 that calculates the spatial position of an object in a real-world environment. The spatial position calculation system 100 comprises a processor 102, a memory 106, e.g., random access memory ("RAM") and/or read only memory ("ROM"), a data storage device 108, a laser emitter 104, and an image capture device 109. An example of the laser emitter 104 is a laser diode that emits light that may then be projected through an optical element (e.g., a lens) or rotated to generate a plurality of laser beams. The image capture device 109 (e.g., a camera) may capture one or more images of the plurality of laser beams and then provide those one or more captured images to the data storage device 108. For instance, the image capture device 109 may capture images of the plurality of laser beams as they are reflected from an object in a real-world environment.

In addition, the data storage device 108 may store spatial position code 110 that, when executed by the processor 102, determines the position of one or more objects in a real-world environment. Further, the processor 102 may execute VR/AR rendering code 112 to render a VR/AR environment based on the real-world spatial position of the one or more objects determined by the processor 102 when executing the spatial position code 110.

In one aspect, the data storage device 108 loads the spatial position code 110 and the VR/AR rendering code 112 from a computer readable storage device, e.g., a magnetic or optical drive, diskette, or non-volatile memory, DVD, CD-ROM, etc. In another aspect, the data storage device 108 is the computer readable storage device. As such, the spatial position code 110, the VR/AR rendering code 112, and associated data structures of the present disclosure may be stored on a computer readable storage device.

The spatial position calculation system 100 improves the functioning of a computing device by reducing the processing time that a VR/AR system uses to determine the real-world spatial position of an object. Instead of performing multiple computations from various sensors and transmitters, the spatial position calculation system 100 reduces computational processing time via the laser emitter 104 and the image capture device 109.

In one aspect, the components of the spatial position calculation system 100 are integrated within one device (e.g., a remote control, headset, etc.). For example, light is emitted, images are captured, and spatial positions are calculated in one integrated device. In another aspect, the components may communicate with each other remotely through a network connection. For example, the processor 102 may be stored on a remote server that communicates with a VR/AR headset that has an integrated laser emitter 104 and image capture device 109.

Figure 2A:
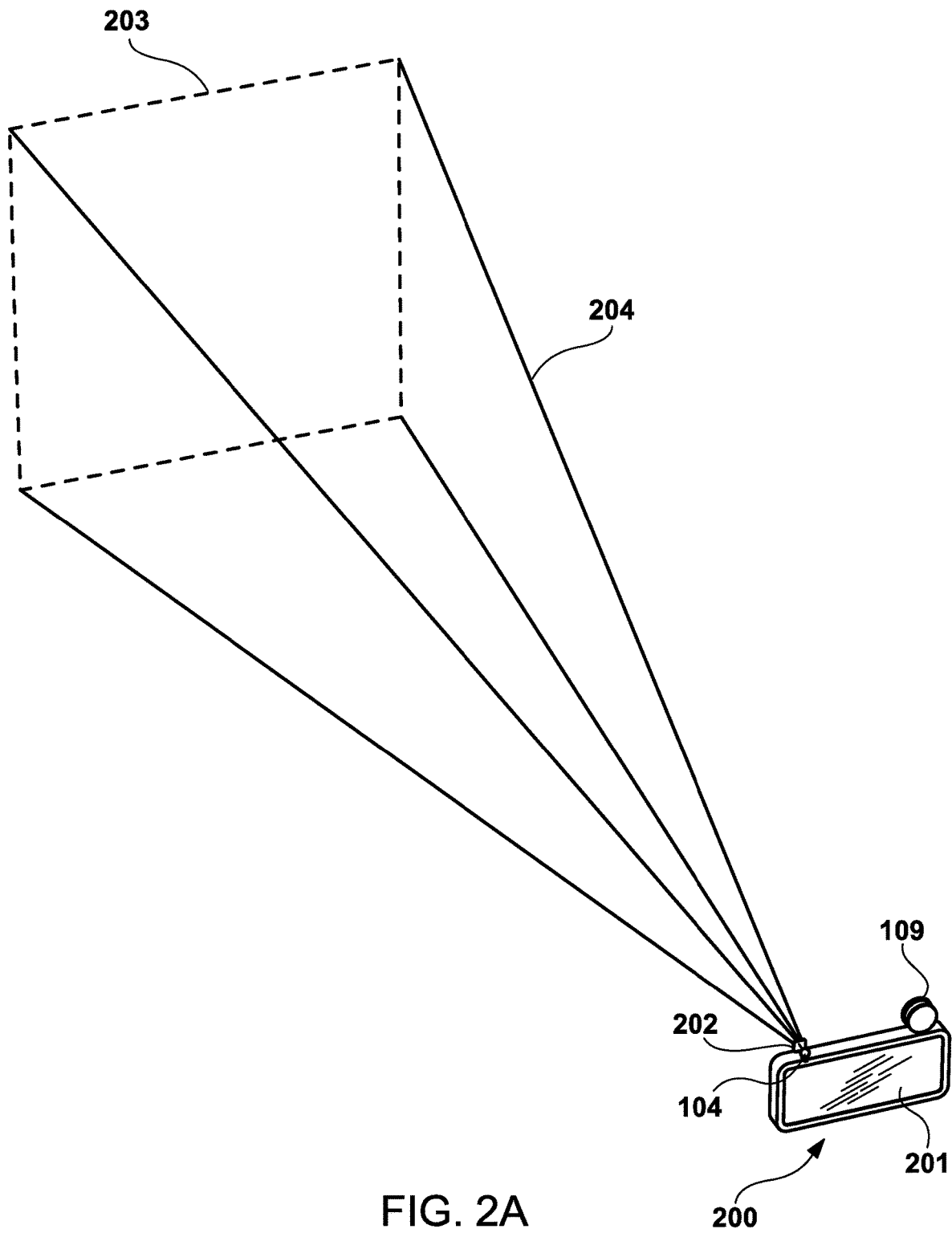
FIG. 2A illustrates an example of a user control device with the integrated componentry of FIG. 1.

FIG. 2A illustrates an example of a user control device 200 with the integrated componentry of FIG. 1. For illustrative purposes, the user control device 200 is illustrated as a smartphone that may be used to provide inputs to a VR/AR user experience via a display screen 201. Other types of devices (e.g., remote control, headset, glasses, watch, smart wearable device, etc.) may be used instead.

The user control device 200 includes the laser emitter 104 and the image capture device 109 illustrated in FIG. 1. The laser emitter 104 (e.g., a light emitting diode ("LED")) may emit one or more lasers through an optical element 202 (e.g., lens, beam splitter, etc.) to generate a plurality of laser beams 204 at one or more fixed angles. For example, the laser emitter 104 in conjunction with the optical element 202 may generate four laser beams 204 that emanate from the user control device 200 to form a laser frustum 203 (i.e., a structure having a particular shape). For example, the laser frustum 203 may have a pyramidal shape that emanates from the user control device 200 at fixed angles to form a square base if the endpoints of the four laser beams 204 are connected. Various fixed angles, quantities of lasers, and shapes for the laser frustum 203 may be used to perform spatial positioning with the user control device 200. Further, various other forms of laser beam generation other than via the optical element 202 (e.g., rotation of the laser emitter 104 without the optical element 202) may be implemented.

In addition, the image capture device 109 may capture the positions of the endpoints of the four laser beams 204 as reflected from an object in the real-world environment. The captured image data may then be analyzed by the processor 102 illustrated in FIG. 1 to determine the spatial positioning of the object in the real-world environment so that the position may be used for an AR and/or VR user experience.

Figure 2B:
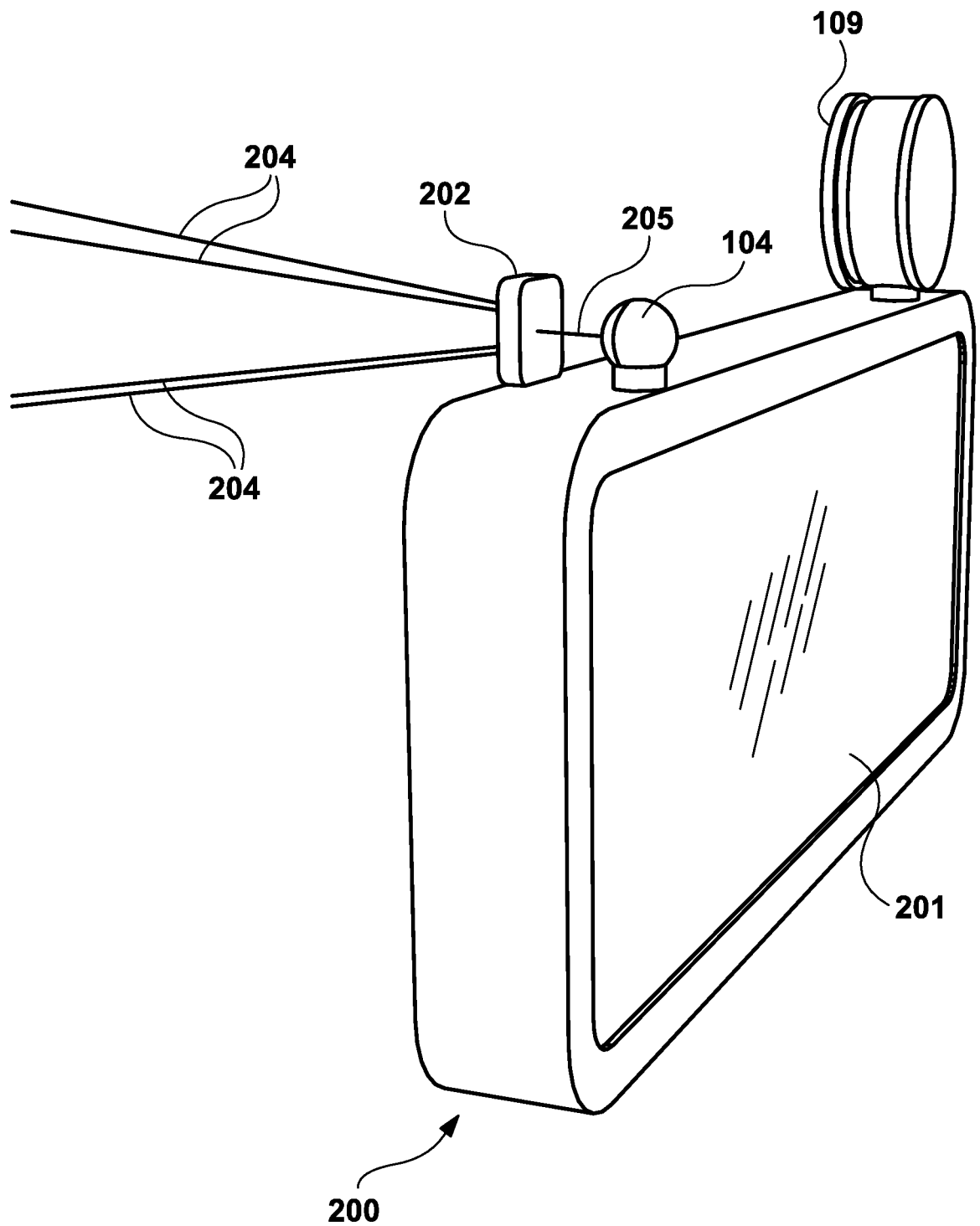
FIG. 2B illustrates a magnified view of the user control device illustrated in FIG. 2A.

FIG. 2B illustrates a magnified view of the user control device 200 illustrated in FIG. 2A. The laser emitter 104 emits a single laser beam 205 that passes through the optical element 202. Further, the optical element 202 splits the single laser beam 205 into the plurality of laser beams 204. In one aspect, the laser emitter 104 and the optical element 202 are two distinct components that are positioned on a surface of the user control device 200. In another aspect, the laser emitter 104 and the optical element 202 are encapsulated in a single structure that is positioned on a surface of the user control device 200.

In addition, the image capture device 109 is illustrated as a distinct component from the laser emitter 104 and the optical element 202. In another aspect, the image capture device 109, the laser emitter 104, and the optical element 202 are encapsulated in a single structure that is positioned on a surface of the user control device 200.

Even though the top portion of the user control device 200 is illustrated as the position for which the various components of FIGS. 2A and 2B are located, other portions may be used instead. For instance, the sides, bottom, etc. may be used.

Figure 2C:
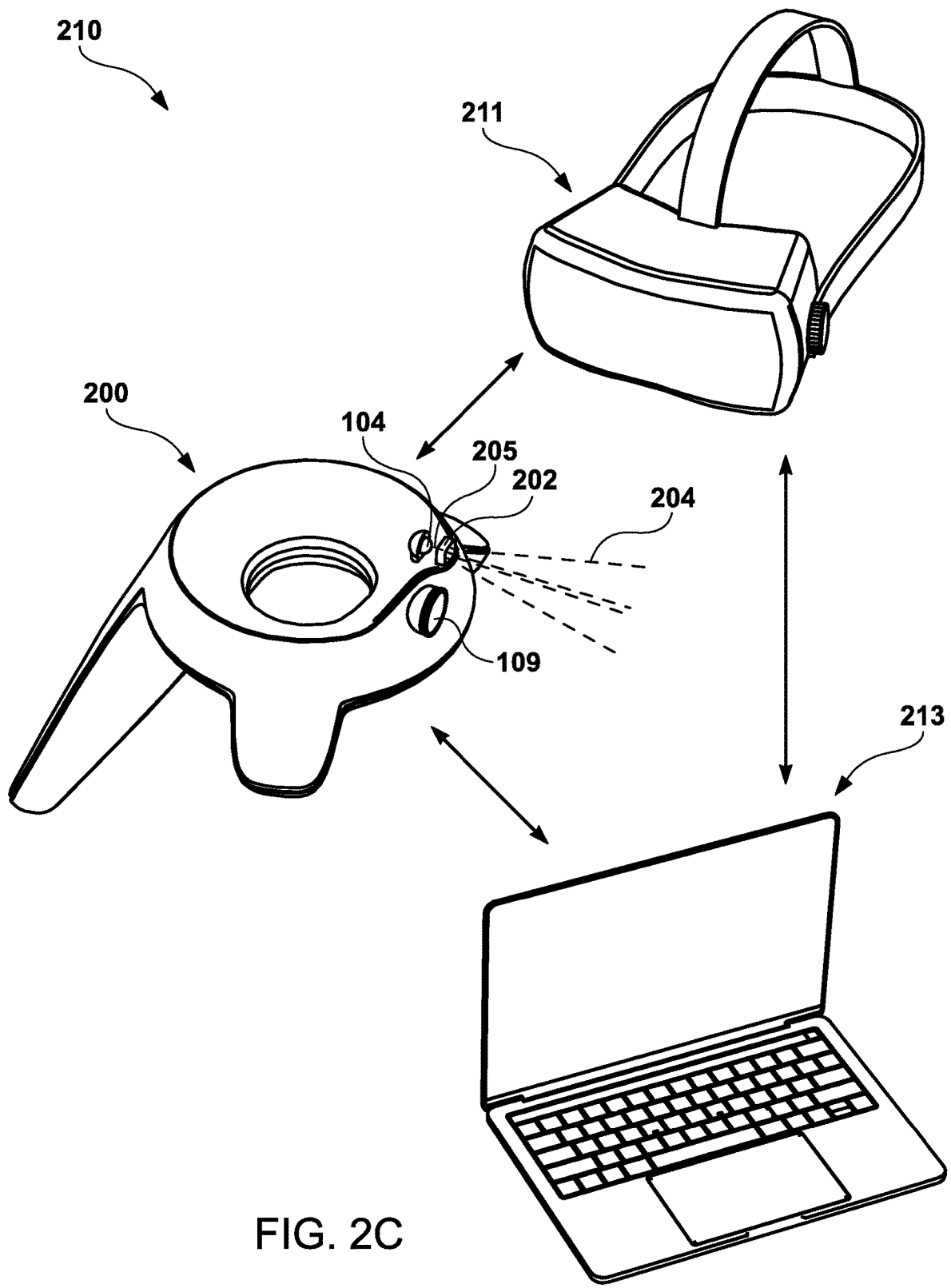
FIG. 2C illustrates an AR/VR configuration that implements the user control device illustrated in FIGS. 2A and 2B.

FIG. 2C illustrates an AR/VR configuration 210 that implements the user control device 200 illustrated in FIGS. 2A and 2B. For example, the user control device 200 may be a hand controller that receives one or more inputs from a user of the AR/VR configuration 210 based on an AR/VR experience provided by an AR/VR headset 211. In other words, the hand controller 200 may communicate by transmitting and/or receiving data to and/or from, respectively, the AR/VR headset 211.

Further, the laser emitter 104, optical element 202, and image capture device 109 may be situated on the top, or other portion, of the illustrated hand controller 200. The hand controller 200 may then send the captured image data, as described with respect to FIGS. 2A and 2B, to a computer 213 (e.g., laptop, personal computer, tablet device, smartphone, smartwatch, gaming console, etc.) for image analysis. Based on the captured image data, the computer 213 then determines, with the processor 102 illustrated in FIG. 1, the location of the hand controller 200 with respect to a real-world environment for corresponding use in the AR/VR experience. The computer 213 may be in local communication with the hand controller 200 (e.g., via a wireless network or cable connection) or in remote communication with the hand controller 200 (e.g., client-server communication through a network).

In an alternative aspect, the processor 102 may be integrated within the AR/VR headset 211 so that the hand controller 200 sends the captured image data to the AR/VR headset 211 for image analysis by the AR/VR headset 211. In yet another aspect, the processor 102 may be integrated within the illustrated hand controller 200 or other form of user control device.

FIGS. 3A, 4A, 5A, and 6A illustrate a user 301 using the user control device 200 illustrated in FIGS. 2A and 2B to configure an AR/VR environment based on the spatial positioning of objects in a real-world environment 302. Initially, the user 301 may perform a calibration configuration where the user 301 moves the user control device 200 around the real-world environment 302, e.g. a physical room, so that the processor 102 (FIG. 1) may determine the dimensions of the real-world environment 302. Alternatively, the dimensions of the real-world environment 302 may be known to the processor 102 prior to the AR/VR user experience without a calibration being performed (e.g., data input of the room dimensions, previously determined dimensions, etc.).

FIG. 3A illustrates the user 301 positioned in a first portion of the real-world environment 302 whereby the user 301 is directly in front of, and in close proximity to, a wall in the real-world environment 302. The endpoints 303-306 of the laser beams 204 reflect off of the wall in an evenly spaced manner. The image capture device 109 captures an image of the spacing of the endpoints 204 to the processor 102. Based on the predetermined dimensions of the real-world environment 302 and the spacing of the endpoints 303-306, the processor 102 (FIG. 1) calculates the spatial positioning of the user control device 200 with respect to the wall.

FIG. 3B illustrates an example of the image of the endpoints 303-306 reflected when the user 301 is in close proximity to the wall in FIG. 3A. In one aspect, the image may be captured within a predefined area 310 (e.g., predetermined or calibrated dimensions of the wall or a portion of the wall). Accordingly, the spacing of the endpoints 303-306 may be measured not just from each other, but also with respect to the perimeter of the predefined area 310. For instance, the endpoint 303 may have an equal distance, or at least no offset, with respect to the left side of the predefined area 310 as the distance of the endpoint 306 with respect to the right side of the predefined area 310.

FIG. 4A illustrates the user 301 positioned in a second portion of the real-world environment 302 whereby the user 301 is directly in front of (but at a farther distance than that of FIG. 3A) a wall in the real-world environment 302. FIG. 4B illustrates an example of the image of the endpoints 303-306 reflected when the user 301 is at a farther distance to the wall illustrated in FIG. 4A. As a result, the endpoints 303-306 are more spaced apart than in FIG. 3B; such spacing allows the processor 102 to determine that the distance of the user control device 200 with respect to the wall, has increased.

FIG. 5A illustrates the user 301 positioned in a third portion of the real-world environment 302 whereby the user 301 is off to an angle with respect to the wall. FIG. 5B illustrates an example of the image of the endpoints 303-306 reflected when the user 301 is off to the angle with respect to the wall illustrated in FIG. 5A. As a result, the orientation, in addition to the spacing, of the endpoints 303-306 may be different than that of the first portion (FIG. 3A) or the second portion (FIG. 4A) of the wall.

For instance, each of the laser beams 204 intersects the wall in FIGS. 3A and 4A at the same distance from the user control device 200. In contrast, with respect to FIG. 5A, the laser beam 204 corresponding to endpoint 304 intersects the wall at a closer proximity to the user control device 200 than the laser beam 204 corresponding to the laser beam 305. As a result, the image captured by the image capture device 109 illustrates the endpoint 304 being further from the left portion of the predefined area 310 than the endpoint 305 is from the right portion of the predefined area 310. Further, the vertical spacing between the endpoints 303 and 304 is less than the vertical spacing between the endpoints 305 and 306 since the laser beams 204 corresponding to the endpoints 303 and 304 travel a shorter distance as they intersect the wall 302 sooner than the laser beams 204 corresponding to the endpoints 305 and 306.

Figure 6A:
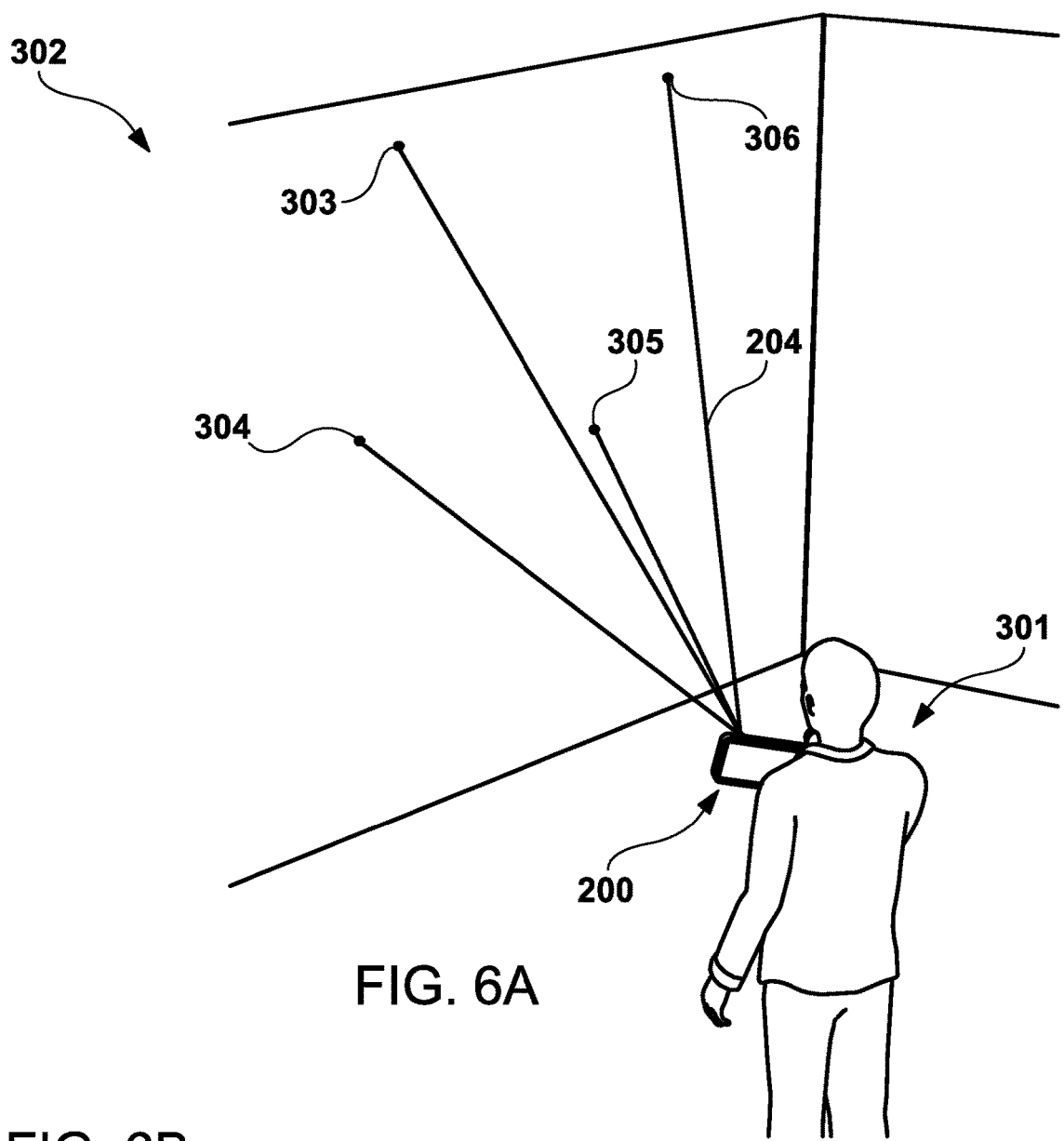
FIG. 6A illustrates the user tilting the user control device illustrated in FIG. 5A.
Figure 6B:
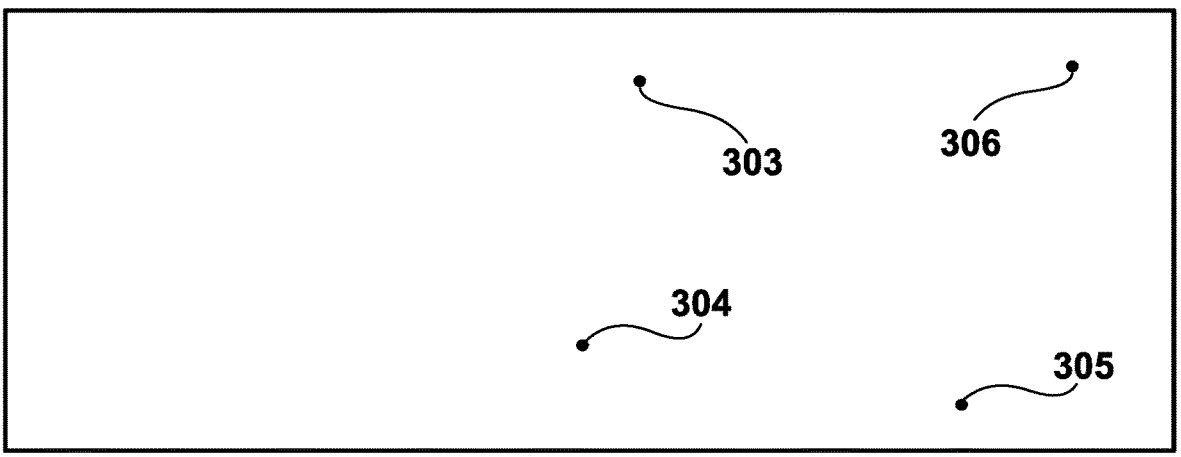
FIG. 6B illustrates an example of the image of the endpoints reflected from the wall illustrated in FIG. 6A as result of the tilt.

FIG. 6A illustrates the user 301 tilting the user control device 200 illustrated in FIG. 5A. FIG. 6B illustrates an example of the image of the endpoints 303-306 reflected from the wall illustrated in FIG. 6A as result of the tilt.

Figure 7:
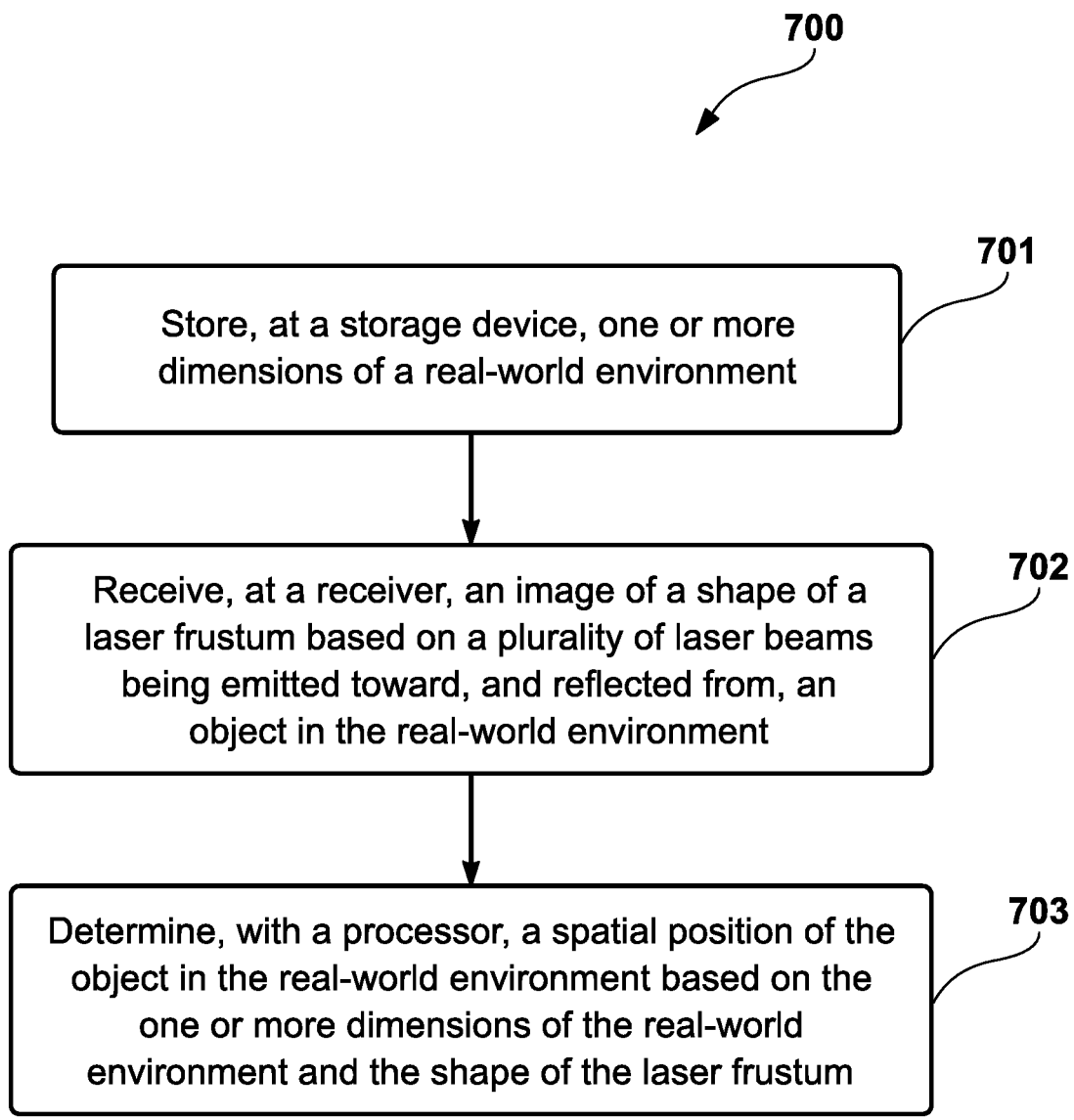
FIG. 7. Illustrates a process that may be utilized by the spatial position calculation system to determine a spatial position of an object in a real-world environment.

FIG. 7 Illustrates a process 700 that may be utilized by the spatial position calculation system 100 (FIG. 1) to determine a spatial position of an object in a real-world environment 302 (FIG. 3A). At a process block 701, the process 700 stores, at a storage device, one or more dimensions of the real-world environment 302. Further, at a process block 702, the process 700 receives, at a receiver, an image of a shape of a laser frustum 203 (FIG. 2A) based on a plurality of laser beams 204 being emitted toward, and reflected from, an object in the real-world environment 302. In addition, at a process block 703, the process 700 determines, with the processor 102 (FIG. 1), a spatial position of the object in the real-world environment 302 based on the one or more dimensions of the real-world environment 302 and the shape of the laser frustum 203. The spatial position of the object is determined for an AR or VR user experience.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., non-transitory computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A user control apparatus comprising:
    a laser emitter configured to emit a laser beam in a real-world environment;
    an optical element configured to receive the laser beam defining a starting point for the laser beam and generate a plurality of laser beams ending in separate endpoints of a plurality of endpoints, wherein the starting point and the plurality of endpoints form a laser frustum;
    an image capture device configured to capture an image of the plurality of endpoints of the plurality of laser beams reflected from an object in the real-world environment;
    a processor configured to:
        determine a shape of the laser frustum based on the image of the plurality of endpoints,
        determine a spatial position of the object in the real-world environment, based on the shape of the laser frustum; and
        render an augmented reality or virtual reality environment based on the spatial position of the object in the real-world environment.

2. The user control apparatus of claim 1, wherein the shape of the laser frustum is determined according to a distance measurement between the plurality of endpoints in the image of the plurality of endpoints.

3. The user control apparatus of claim 1, wherein the spatial position of the object in the real-world environment is further determined based on one or more predetermined dimensions of the real-world environment.

4. The user control apparatus of claim 1, wherein the optical element comprises a lens or a beam splitter.

5. The user control apparatus of claim 1, wherein the optical element is configured to generate the plurality of laser beams such that the plurality of laser beams emanates from the user control apparatus at a plurality of constant angles.

6. The user control apparatus of claim 1, wherein the laser emitter, the optical element, and the image capture device are positioned on a top portion of the user control apparatus.

7. The user control apparatus of claim 1, wherein the image of the plurality of endpoints is a two-dimensional image.

8. The user control apparatus of claim 1, further comprising at least one input device configured to provide a user input in the augmented reality or virtual reality environment.

9. A system comprising:
a storage device configured to store one or more dimensions of a real-world environment;
a receiver configured to receive an image of a plurality of endpoints of a laser frustum reflected from an object in the real-world environment;
a processor configured to:
determine a shape of the laser frustum based on the image of the plurality of endpoints,
determine a spatial position of the object in the real-world environment based on the one or more dimensions of the real-world environment and the shape of the laser frustum, and
render an augmented reality or virtual reality environment based on the spatial position of the object.

10. The system of claim 9, wherein the shape of the laser frustum is determined according to a distance measurement between the plurality of endpoints in the image of the plurality of endpoints.

11. The system of claim 9 further comprising a laser emitter and an optical element, wherein the plurality of laser beams is generated by a laser emitter sending a laser through an optical element.

12. The system of claim 11, wherein the optical element is configured to generate the plurality of laser beams such that the plurality of laser beams emanates at a plurality of constant angles.

13. The system of claim 9, wherein the image of the plurality of endpoints is a two-dimensional image.

14. The system of claim 9 further comprising a user control device, wherein the processor is integrated within a user control device that provides one or more inputs to the augmented reality or virtual reality environment.

15. The system of claim 9 further comprising a user control device, wherein the processor is configured to communicate, via a network, with a user control device configured to provide one or more inputs to the augmented reality or virtual reality environment.

16. A computer program product comprising a non-transitory computer readable storage device having a computer readable program stored thereon, wherein the computer readable program when executed on a computer causes the computer to:
store, at a storage device, one or more dimensions of a real-world environment;
receive, at a receiver, an image of a plurality of endpoints of a laser frustum reflected from an object in the real-world environment;
determine, with a processor, a shape of the laser frustum based on the image of the plurality of endpoints; and
determine, with the processor, a spatial position of the object in the real-world environment based on the one or more dimensions of the real-world environment and the shape of the laser frustum, and
render an augmented reality or virtual reality environment based on the spatial position of the object in the real-world environment.

17. The computer program product of claim 16, wherein the shape of the laser frustum is determined according to a distance measurement between the plurality of endpoints in the image of the plurality of endpoints.

18. The computer program product of claim 16, wherein a laser emitter is configured to generate the plurality of laser beans by sending a laser through an optical element.

19. The computer program product of claim 18, wherein the optical element is configured to generate the plurality of laser beams such that the plurality of laser beams emanates at a plurality of constant angles.

20. The computer program product of claim 16, wherein the image of the plurality of endpoints is a two-dimensional image.

* * * * *

UNITED STATES PATENT AND TRADEMARK OFFICE
CERTIFICATE OF CORRECTION

PATENT NO. : 10,818,097 B2
APPLICATION NO. : 15/839729
DATED : October 27, 2020
INVENTOR(S) : Chapman et al.

Page 1 of 1

It is certified that error appears in the above-identified patent and that said Letters Patent is hereby corrected as shown below:

In the Claims

At Column 8, Line 40:
"beans by sending a laser through an optical element."
Should read:
--beams by sending a laser through an optical element.--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*